United States Patent [19]

Brennan

[11] Patent Number: 5,423,108
[45] Date of Patent: Jun. 13, 1995

[54] CAM ACTUATED CONTROLLER FOR ROPES AND THE LIKE

[76] Inventor: Daniel F. Brennan, 216 State St., Hamburg, Pa. 19526

[21] Appl. No.: 162,268

[22] Filed: Dec. 7, 1993

[51] Int. Cl.⁶ ............................................. A44B 21/00
[52] U.S. Cl. .................................... 24/134 R; 24/298
[58] Field of Search ............ 24/132 R, 134 R, 134 L, 24/134 KB, 300–302, 298, 265 H; 248/499; 410/101

[56] References Cited

U.S. PATENT DOCUMENTS

| | | | |
|---|---|---|---|
| 563,591 | 7/1896 | Hill | 24/134 R |
| 1,424,084 | 7/1922 | Cole | 24/134 R |
| 2,471,503 | 5/1949 | Ward et al. | 24/134 R |
| 2,661,514 | 12/1953 | Martin | 24/134 KB |
| 2,845,674 | 8/1958 | Pearson | 24/134 R |
| 2,867,875 | 1/1959 | Davison | 24/134 R X |

Primary Examiner—James R. Brittain
Attorney, Agent, or Firm—Clifton Ted Hunt

[57] ABSTRACT

A rope controller constructed without a spring or any other resilient means for controlling movement of a rope having a standing end and a free end. The rope controller is cam actuated and includes a housed cam which is journaled for movement toward and away from a clamping portion of the housing and is responsive to movement of a rope in either direction. The cam is activated to prevent movement of the standing end of the rope by tensioning the standing end of the rope. The cam is deactivated to permit movement of the free end of the rope by tensioning the free end of the rope. The cam is deactivated to permit movement of the rope in either direction by manually depressing an extension of the cam.

7 Claims, 4 Drawing Sheets

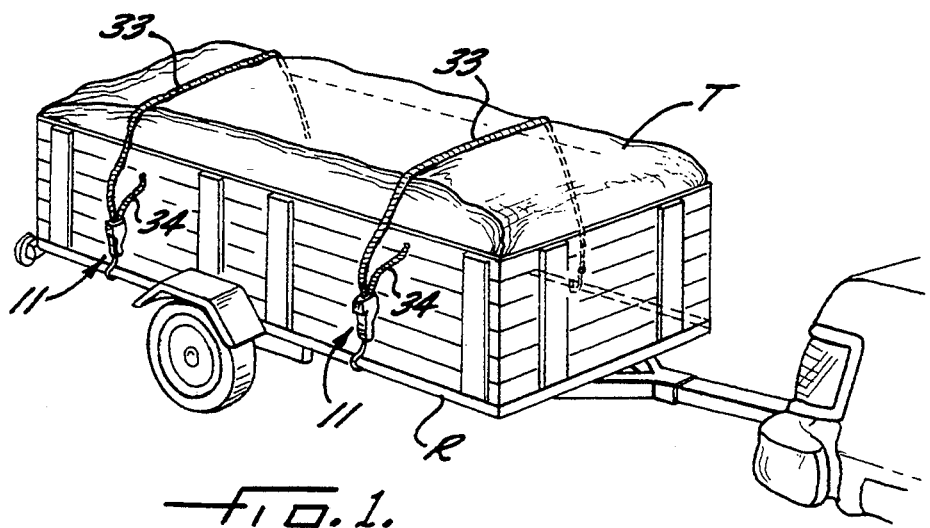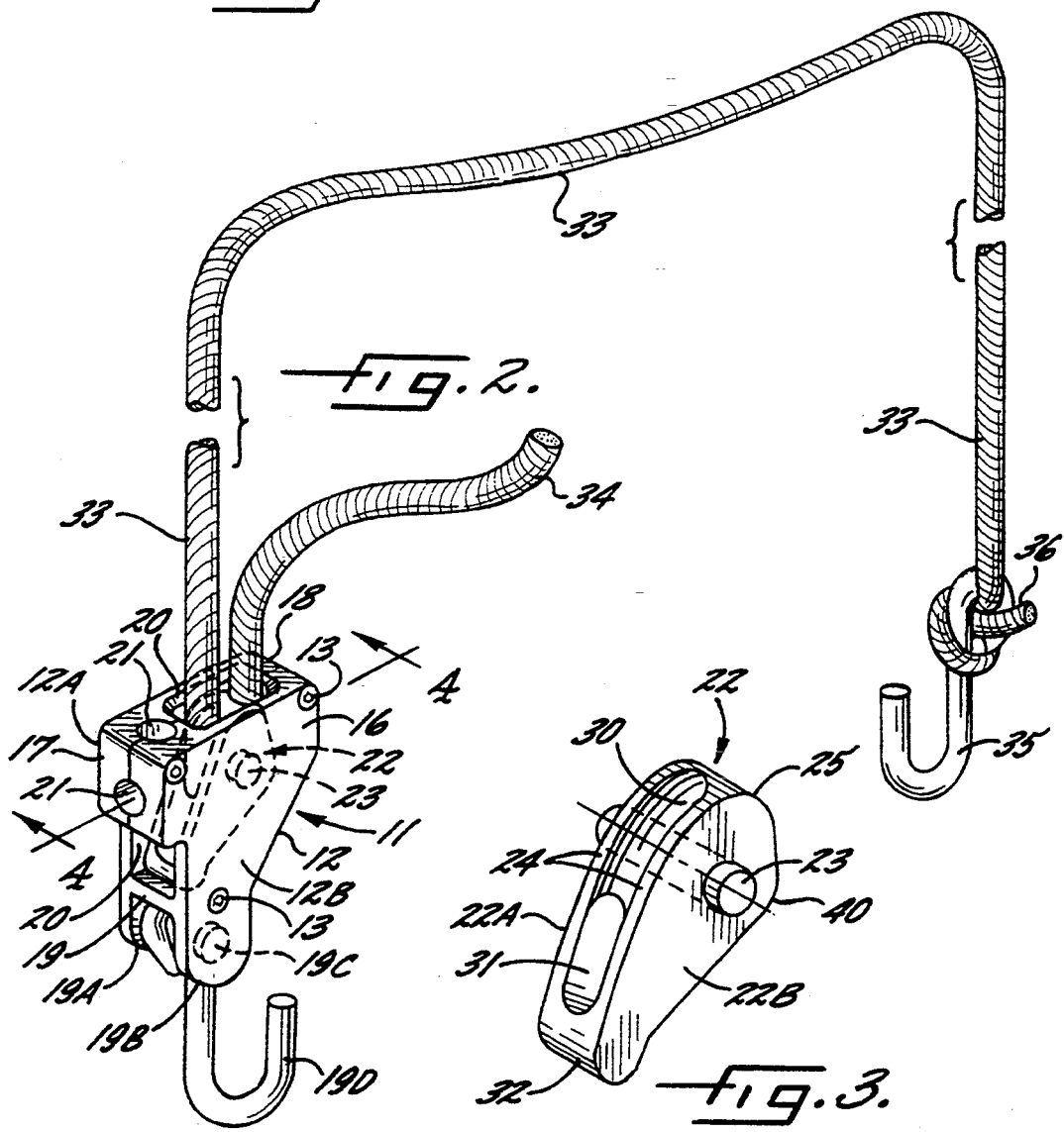

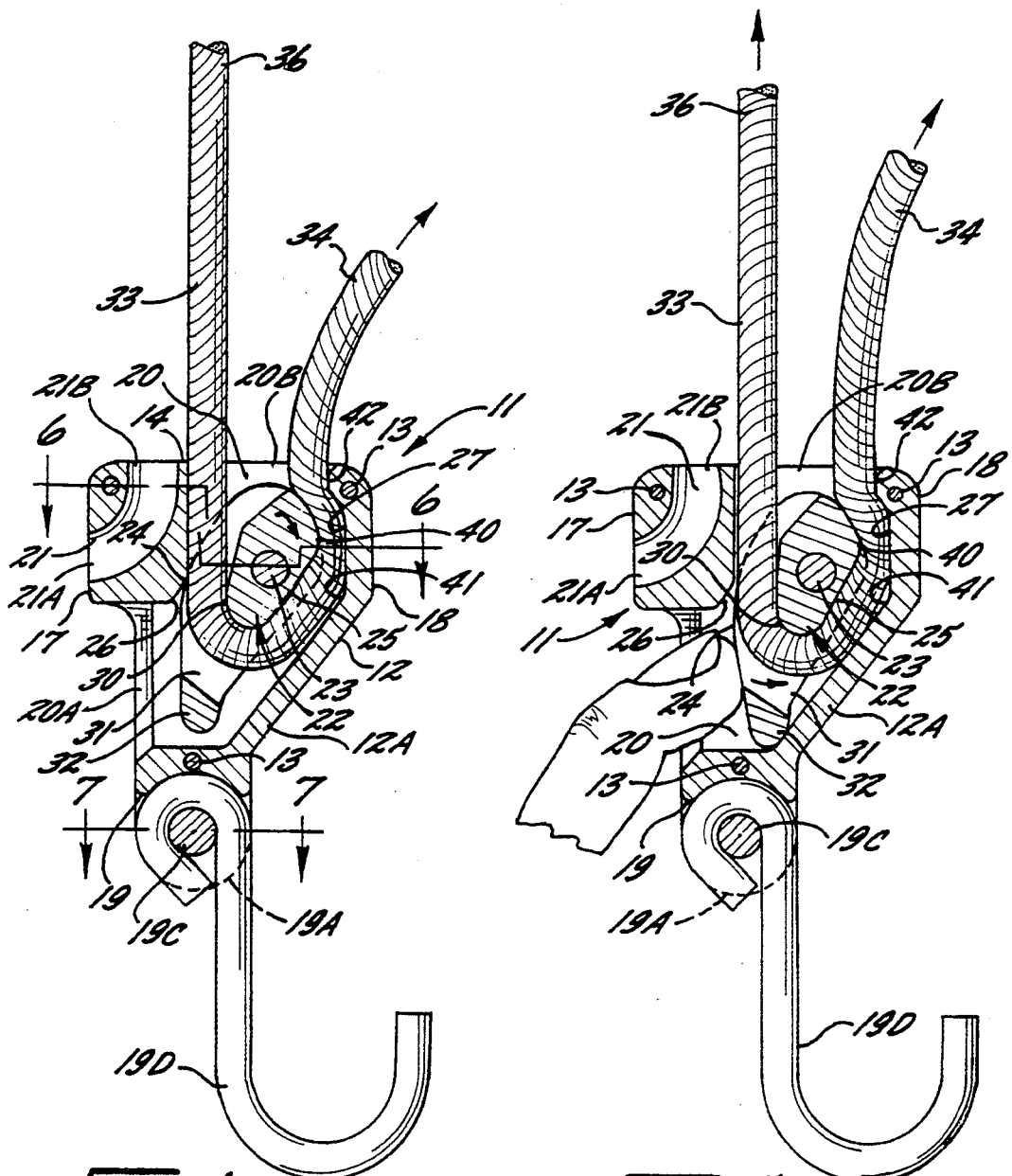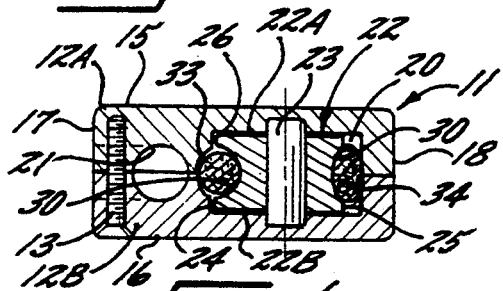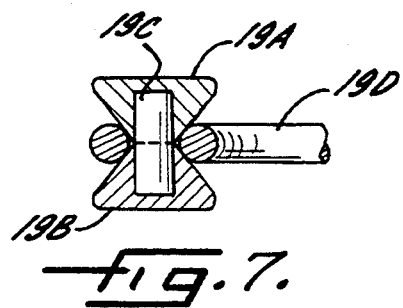

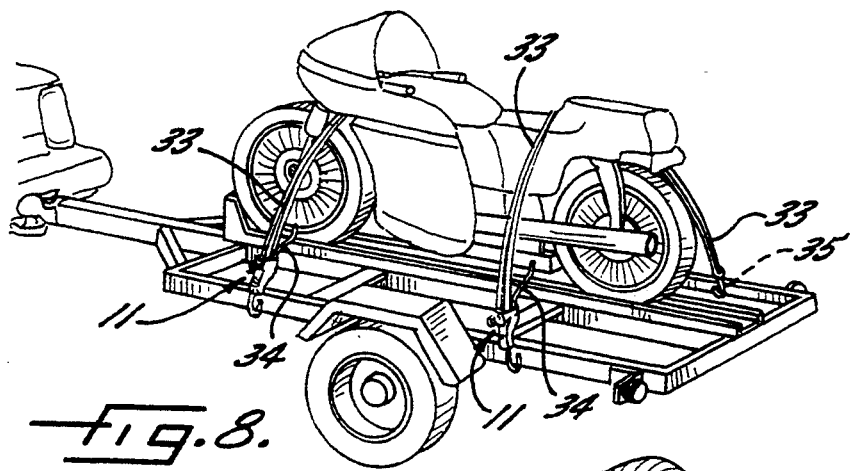
Fig. 8.
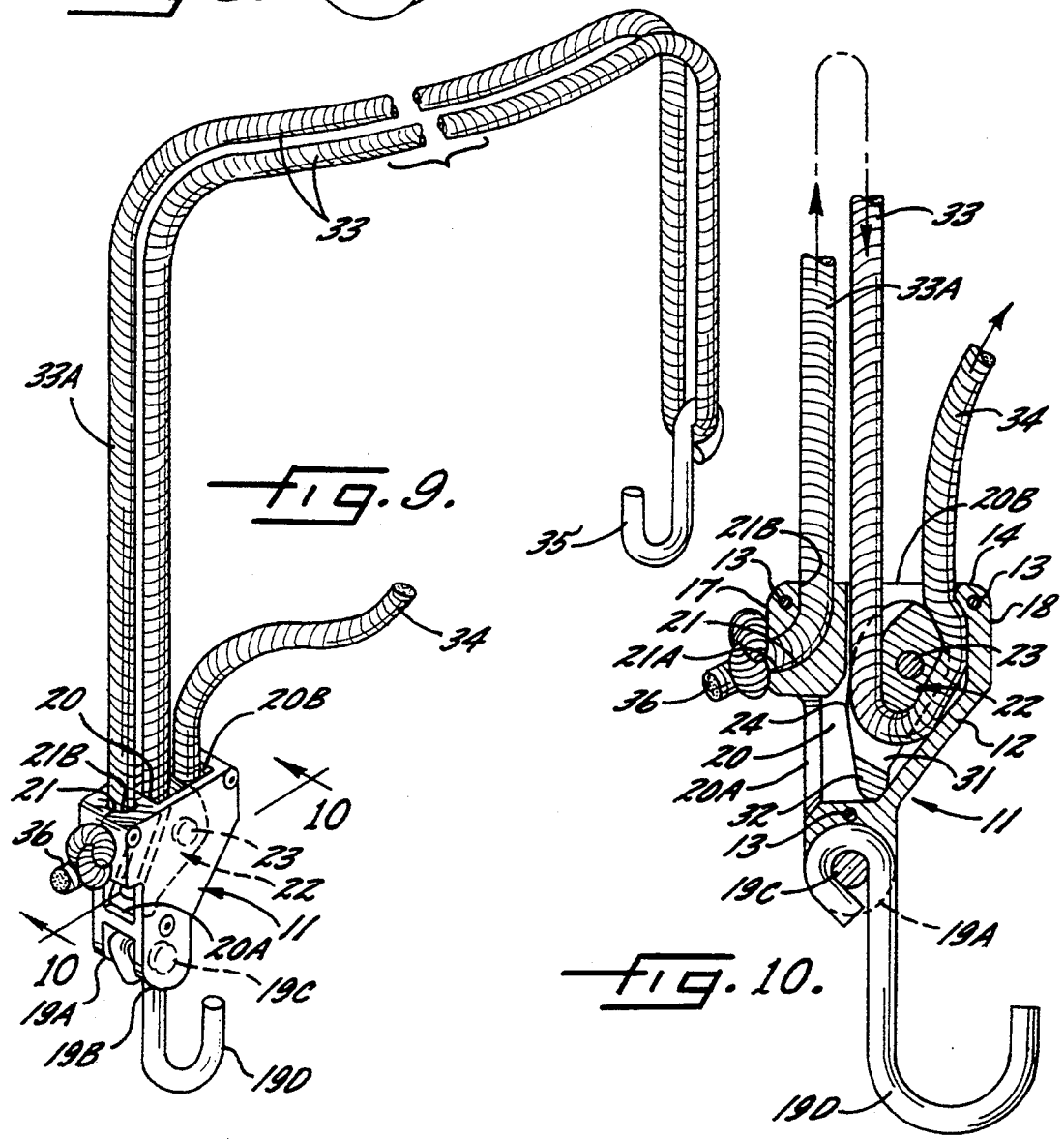
Fig. 9.
Fig. 10.

5,423,108

CAM ACTUATED CONTROLLER FOR ROPES AND THE LIKE

FIELD OF THE INVENTION

This invention relates to hand operated mechanisms for controlling a rope, strap, webbing, or the like, (hereinafter collectively referred to as rope) while paying out or hauling in, and to releasably securing a rope under tension at a desired point.

BACKGROUND OF THE INVENTION

Mechanisms for controlling a rope while paying it out or hauling it in and to releasably secure a rope under tension are Known in the prior art. See, for example, U.S. Pat. No. 4,716,630 issued Jan. 5, 1988 to Helmut K. Skyba for CAM LOCK WITH POSITIVE RELEASE and U.S. Pat. No. 4,787,474 issued Nov. 29, 1988 to Daniel F. Brennan for ROPE CONTROLLER.

Those two prior art mechanisms, and all others known to applicant, utilize a spring-pressed cam within a housing, through which the rope passes, to selectively grip the rope at a desired point between the cam and a portion of the housing. The spring normally urges the cam against the rope. An operator may manually move the cam away from the rope by pressing against the cam to overcome the spring pressure and free the rope.

The springs are critical to the satisfactory operation of the known prior art devices for controlling the paying out and hauling in of a rope, and the tendency of the springs to become inoperative for one reason or another, such as becoming fouled with debris, adversely affects the utility of the prior art devices.

SUMMARY OF THE INVENTION

It is the primary object of this invention to overcome the disadvantages of the prior art rope controllers by providing a cam actuated rope controller which functions without a spring.

According to the invention, the cam is pivotally mounted in a strategic position within a housing to guide a rope, which is inserted into the housing, around the cam and out of the housing. In one embodiment of the invention, the rope is guided into the housing and around the cam by rollers. Before the rope leaves the housing, it must pass between a high point on the cam and a clamping surface on the housing.

Any attempt to move the rope through the housing and around the cam in a clockwise direction correspondingly rotates the cam in a clockwise direction and rotates its high point toward the clamping surface on the housing to clamp the rope.

The cam includes an operative extension, engageable by a person's finger reaching through an opening in the housing. Inward pressure against the extension rotates the cam in a counter-clockwise direction which rotates the high point of the cam away from the clamping surface on the housing to free the rope for movement in either direction.

BRIEF DESCRIPTION OF THE DRAWINGS

FIG. 1 is a perspective view of a trailer, illustrating the use of the cam actuated rope controller for tieing down a tarpaulin over the trailer;

FIG. 2 is a perspective view of the cam actuated rope controller shown in FIG. 1 with a rope threaded through the housing of the rope controller and around the cam, the rope having a free end 34 and a standing end 36;

FIG. 3 is a perspective view of the cam by itself, removed from the housing of the rope controller and omitting the rope;

FIG. 4 is a sectional view of the rope controller with a rope threaded through it and illustrating the cam in clamping position for holding the rope under maximum tension, and illustrating how the side of the cam opposite the high point engages the housing to limit clamping pressure and prevent rupture of the rope;

FIG. 5 is a sectional view of the rope controller with a rope threaded through it and showing a person's finger reaching through an opening in the housing and pressing against an operable extension of the cam to rotate the cam away from the clamping position of FIGS. 4 and 4A;

FIG. 6 is a sectional view taken substantially along the line 6—6 in FIG. 4;

FIG. 7 is a sectional view taken substantially along the line 7—7 in FIG. 4;

FIG. 8 is a perspective view of a motorcycle tied to a trailer and illustrating use of the cam actuated rope controller to obtain a two-to-one ratio for tieing down a heavy load;

FIG. 9 is a perspective view similar to FIG. 2 but showing the cam actuated rope controller rigged for using a two-to-one ratio for a tie-down of a heavy load;

FIG. 10 is a sectional view taken substantially along the line 10—10 in FIG. 9.

DETAILED DESCRIPTION OF THE INVENTION

STRUCTURE OF THE EMBODIMENT OF FIGS. 1–10

Figures 11, 12:
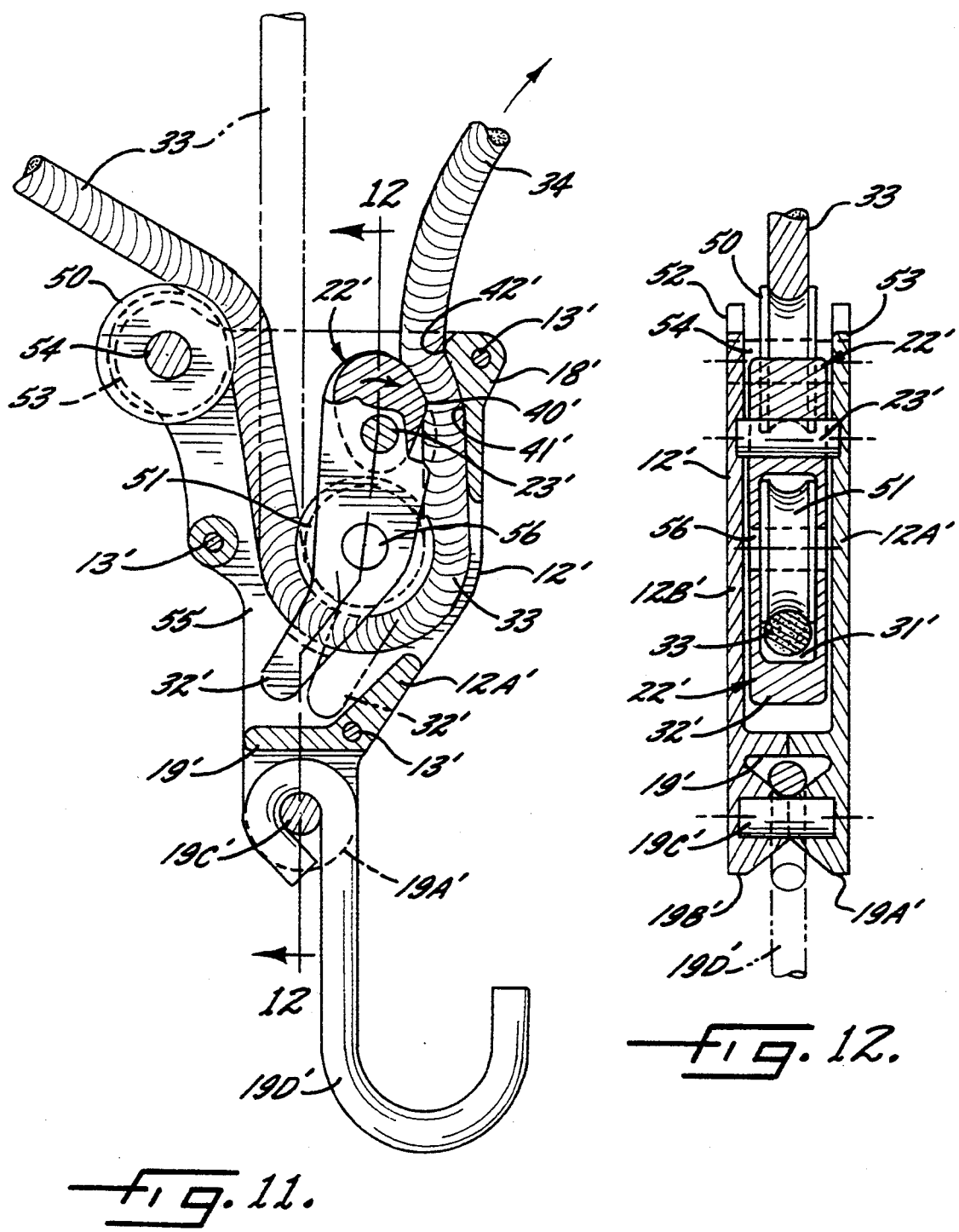
FIG. 11 is a sectional view, similar to FIG. 4, of a modified form of the invention wherein rollers are provided for guiding the rope into the housing and around the cam.
FIG. 12 is a sectional view taken substantially along the line 12—12 in FIG. 11.

Referring more specifically to FIGS. 1–10 in the drawings, the cam actuated rope controller (controller) is broadly indicated at 11. The controller 11 comprises a housing or cover 12 formed by two pieces of metal 12A and 12B, held together by screws or rivets 13. In the drawings, the housing has a top wall 14, side walls 15 and 16, end walls 17 and 18, and a bottom wall 19, from which depend spaced ears or lugs 19A and 19B, supporting a shaft 19C, which supports a hook 19D.

The two halves 12A and 12B of the housing 12 are internally contoured in a mirror image of each other to define a first passageway 20 that extends angularly through the housing and communicates at 20A with the end wall 17 and at 20B with the top wall 14. A second passageway 21, smaller than the passageway 20, also extends angularly through the housing and communicates at 21A with the end wall 17 and at 21B with the top wall 14.

The passageway 20 houses an angularly extending cam broadly indicated at 22. The body portion of the cam 22 is mounted on a shaft 23 which extends laterally between opposite sides of the cam's body portion and is journaled in the side walls 15 and 16 of the housing 12, as best seen in FIGS. 3 and 6.

The cam 22 is mounted in the passageway 20 with sidewalls 22A and 22B of the cam 22 beside the side walls 15, 16 of the housing 12. Stabilizing end 24 of the cam 22 is normally positioned adjacent the wall 26 of the passageway 20 and operative or high end 25 of the cam 22 is normally positioned adjacent the opposed wall 27 of the passageway 20. An operative extension 32 of the cam 22 is positioned within the passageway 20 in inwardly spaced relation to the end wall 17 of the housing 12.

The cam 22 has a groove 30 between its side walls 22A and 22B. The groove 30 extends around the lower body portion of the cam 22. A passageway 31 also extends through the cam between the side walls 22A and 22B and between the groove 30 and the operative extension 32 of the cam 22 (FIG. 3). The diameter of the groove 30 and the dimensions of the passageway 31 are sized to fit a selected gauge of rope 33.

The controller 11 is associated with a rope to be controlled by first pushing the free end 34 of the rope 33 into the opening 20B at the top of the passageway 20 (FIG. 4). The free end 34 of the rope is then pushed through the passageway 31 in the cam 22 and along the groove 30 that extends around the cam 22, and then outwardly from the housing 12 through the same opening 20B at the top of the passageway 20 (FIGS. 2, 4, and 5). A hook 35 may be fixed to the standing end 36 of the rope 33 (FIG. 2).

Excessive binding pressure could crush and rupture the rope, but, as shown in FIG. 4, when the operative or high end 25 of the cam 22 is rotated in a clockwise direction into binding relation with the rope 33, the stabilizing end 24 of the cam moves against the wall 26 of the passageway 20 and prevents further movement of the high end 25 of the cam 22 in a clockwise direction toward the wall 27 of the passageway 20. Engagement of the stabilizing end 24 of the cam 22 with the wall 26 of the passageway 20 thereby limits the amount of binding pressure that can be applied to the rope 33 by the operative or high end 25 of the cam, and prevents the rope from being crushed or ruptured between the cam and the housing. The cam is so structured that an effective binding pressure (up to 300 pounds) may be applied to the rope, but excessive binding pressure is prevented when the stabilizing end 24 of the cam engages the wall 26.

STRUCTURE OF THE EMBODIMENT OF FIGS. 11 AND 12

The second embodiment of FIGS. 11 and 12 is structurally and functionally similar to the first embodiment of FIGS. 1-10 and like parts in the second embodiment bear the same reference characters as in the first embodiment with the prime notation added.

The second embodiment differs from the first embodiment in the provision of a roller 50 for guiding the rope 33 into a modified cover $12^1$ and the provision of a roller 51 for guiding the rope around a modified cam $22^1$.

The cover $12^1$ is modified to accept the roller 50 by eliminating the structure that defines the passageway 21 of the first embodiment and substituting transversely spaced ears 52 and 53 between which extends a shaft 54 that journals the roller 50 in the cover $12^1$.

The roller 51 is mounted in an opening 55 in a cam housing 22H and is journaled on a shaft 56 that is in turn journaled in the cam housing 22H. Cam $22^1$ is journaled on the cam shaft $23^1$ extending between the sides $12A^1$ and $12B^1$ of the cover $12^1$, as in the first embodiment The cam housing 22H extends downwardly in FIG. 11 beyond the roller 51 and beyond the opening 55 to define an operative extension $32^1$.

OPERATION

Movement of the rope through the groove 30 in the first embodiment or around the roller 51 in the cam housing 22H of the second embodiment imparts rotation to the cam 22 or $22^1$ about its shaft 23 or $23^1$ in the direction the rope is moving. Thus, movement of the rope responsive to tension on the standing end 36 of the rope imparts clockwise movement to the cam 22 or $22^1$ into locking position, while movement of the rope responsive to tension on the free end 34 of the rope imparts counter-clockwise movement to the cam 22 or $22^1$ and moves it out of locking position.

When the cam is rotated in a clockwise direction in FIGS. 4, 5, 10, and 11 by tensioning the standing rope end 36, a high point or protuberance 40 or $40^1$ on the cam 22 or $22^1$ bears against and binds the rope 33 between the: protuberance 40 or $40^1$ and a clamping portion 41 or $41^1$ of the inner surface of cover wall 18 or $18^1$. When the cam is rotated in a counter-clockwise direction, as when the free end 34 of the rope is tensioned, the high point or protuberance 40 or $40^1$ on the cam moves away from the inner surface of the end wall 18 or $18^1$ of cover 12 or $12^1$ and permits movement of the rope end 34 outwardly from the controller in the direction of the arrow in FIGS. 4 and 11.

The cam 22 or $22^1$ is released from the locking position of FIGS. 4 and 11 by manually depressing the operative extension 32 of the cam 22 in the first embodiment, or the operative extension $32^1$ of the cam housing 22H in the second embodiment. This is accomplished in the first embodiment by a person inserting a finger into the opening 20A of passageway 20 in FIG. 5 and pressing against the operative extension 32 of cam 22 to rotate the cam in a counterclockwise direction and move the locking end 25 of the cam 22 away from the wall 18 of the housing 12 and out of binding relation to the rope 33. The rope is then free to move through the controller 11 in either direction, responsive to tension on either the free end 34 or the standing end 36, while the operative extension 32 is depressed.

The same procedure is followed to release the rope in the second embodiment. The operative extension $32^1$ in FIG. 11 is manually pushed inwardly from its solid line position to its dotted line position to move the high point $40^1$ of cam $22^1$ away from the clamping portion $41^1$ of wall $18^1$.

UTILITY

In use as a tie-down for vehicular load, the function of both embodiments is the same. The function of both embodiments is set forth below with reference to only the first embodiment.

When used as a tie-down for a light to moderate load, as for holding a tarpaulin T on a trailer R (FIG. 1), the controller 11 may be held in place by fastening its hook 19D to one side of the trailer R and passing the standing end 36 and its hook 35 across the tarpaulin T preparatory to fastening the hook 35 to the opposite side of the trailer R.

The rope 33 is tightened across the tarpaulin T by grasping the free end 34 of the rope and pulling the rope through the controller 11 while rotating the cam in a counterclockwise direction. When the rope 33 is desirably tightened across the tarpaulin T, the free end 34 of the rope is released. The tension in the portion of the rope across the tarpaulin rotates the cam in a clockwise direction and moves the high point 40 of the cam into clamping position to hold the rope in the desired tensioned state across the tarpaulin.

In use as a tie-down for a heavy load, as for holding a motorcycle M on the trailer R (FIG. 8), the standing end 36 of the rope 33 is removed from the hook 35 and the rope 33 is doubled on itself to form two strands of rope 33 and 33A. The hook 35 is threaded on the strand 33A of the rope, after which the standing end 36 is drawn through the passageway 21 in the housing 12 of the first embodiment, from opening 21B to opening 21A (FIG. 9), and tied in a knot as at 43.

The hook 19D of the controller 11 is fastened to one side of the trailer R. The two rope strands 33 and 33A and the hook 35 are passed across the motorcycle M, or other heavy load, and the hook 35 is fastened to the opposite side of the trailer R. The two strands 33 and 33A are tensioned against the motorcycle by applying force to tension the free end 34 extending from the controller 11.

The two-to-one ratio provided by the strands 33 and 33A and the hook 35 enables the application of twice the tension on a heavy load with the same force that was used to apply a suitable tension to the single strand of rope across the trailer T in FIG. 1.

Although specific terms have been employed in describing the invention, they have been used in a generic and descriptive sense only and not for the purpose of limitation.

I claim:

1. A cam actuated rope controller comprising:
   (a) a housing including a top wall, a bottom wall, opposed side walls and end walls;
   (b) a cam within said housing;
   (c) a high point on said cam;
   (d) a clamping portion on the inner surface of the housing opposed to the high point on the cam;
   (e) a rope having a free end and a standing end;
      (i) the free end and the standing end of the rope extending into and from the top wall of the housing through a first angular passageway that communicates with the top wall and with an end wall of the housing and between the high point on the cam and the opposed clamping portion on the housing and the free end of the rope then extending outwardly beyond the housing; and
   (f) a second angular passageway communicating with the top wall and with said end wall of the housing; whereby the standing end of the rope may be passed through the second passageway and knotted to retain the standing end of the rope in said second passageway and the rope doubled on itself to increase the mechanical advantage when the rope is tightened about a load to form a tie-down; and
   whereby tensioning of the standing end of the rope moves the high point on the cam toward the clamping portion on the housing to prevent the standing end of the rope from being drawn outwardly from the housing while the standing end is tensioned, and tensioning of the free end of the rope moves the high point on the cam away from the clamping portion on the inner surface of the housing to allow only the free end of the rope to be drawn outwardly from the housing while the free end of the rope is tensioned.

2. The invention of claim 1 which includes a roller journaled in the housing for guiding the rope into the housing.

3. The invention of claim 2 which includes a cam housing and a second roller journaled in the cam housing for guiding the rope around the cam.

4. Apparatus for controlling the movement of a rope, said apparatus comprising:
   (a) a housing including a top wall, a bottom wall, opposed side walls and opposed end walls;
   (b) said housing having a first angular passageway communicating with the top wall and an adjoining end wall of the housing;
   (c) a cam within the first angular passageway in inwardly spaced relation to the top wall and said adjoining end wall and journaled to the side walls of the housing;
      (i) the cam including an operative extension spaced inwardly from said adjoining end wall;
      (ii) the cam having a groove and a passageway extending around the lower body portion of the cam;
      (iii) a high point on the cam;
   (d) a clamping portion on that portion of the wall of the first angular passageway opposed to the high point on the cam;
   (e) a rope having a free end and a standing end, the free end extending into the first angular passageway from the top wall, into the passageway through the cam and along the groove extending around the lower portion of the cam, and then outwardly from the first angular passageway through the top wall of the housing;
   (f) the cam being responsive to tension on the standing end of the rope to move the high point on the cam toward the clamping portion on the wall of the first passageway to prevent the standing end from moving outwardly of the housing;
   (g) the cam being responsive to tension on the free end of the rope to move the high point on the cam away from the clamping portion on the wall of the first passageway to release the rope for movement of its free end outwardly from the housing; and
   (h) means for manually rotating the cam to move the high point on the cam away from the bearing surface on the wall of the first passageway to release the rope for movement of the rope in either direction when tension is applied to either end of the rope.

5. A cam actuated rope controller comprising:
   (a) a cover including a top wall, a bottom wall, opposed side walls and end walls;
   (b) said cover having first and second angular passageways that communicate with the top wall and with an end wall of the cover;
   (c) a roller journaled in said second angular passageway;
   (d) a cam housing within said first angular passageway;
   (e) a second roller journaled in said cam housing;
   (f) a cam within said cam housing;
      (i) the cam being journaled in the opposed side walls of the cover;
   (g) a high point on said cam; and
   (h) a clamping portion on the inner surface of the cover opposed to the high point on the cam;
   whereby a rope may extend through the cover and around the second roller with a medial portion of the rope extending between the high point on the cam and the opposed clamping portion on the cover, and whereby the cam is responsive to movement of the rope through the cover in either direction to move toward or away from the clamping portion and thereby clamp or release the rope.

6. The invention of claim 5 which includes means for manually deactivating the cam to permit movement of the rope through the cover in either direction.

7. The invention of claim 6 wherein said means comprises an operable cam extension on the cam housing accessible from outside the cover through said second annular passageway.

* * * * *